Oct. 24, 1967  M. P. POITEVIN DE FONTGUYON  3,348,315
DEVICE FOR THE STABLE DETERMINATION OF THE VERTICAL
ABOVE A GIVEN POINT

Filed March 5, 1965  5 Sheets-Sheet 1

INVENTOR
MARIE PIERRE POITEVIN DE
FONTGUYON
By Irwin S. Thompson
ATTY.

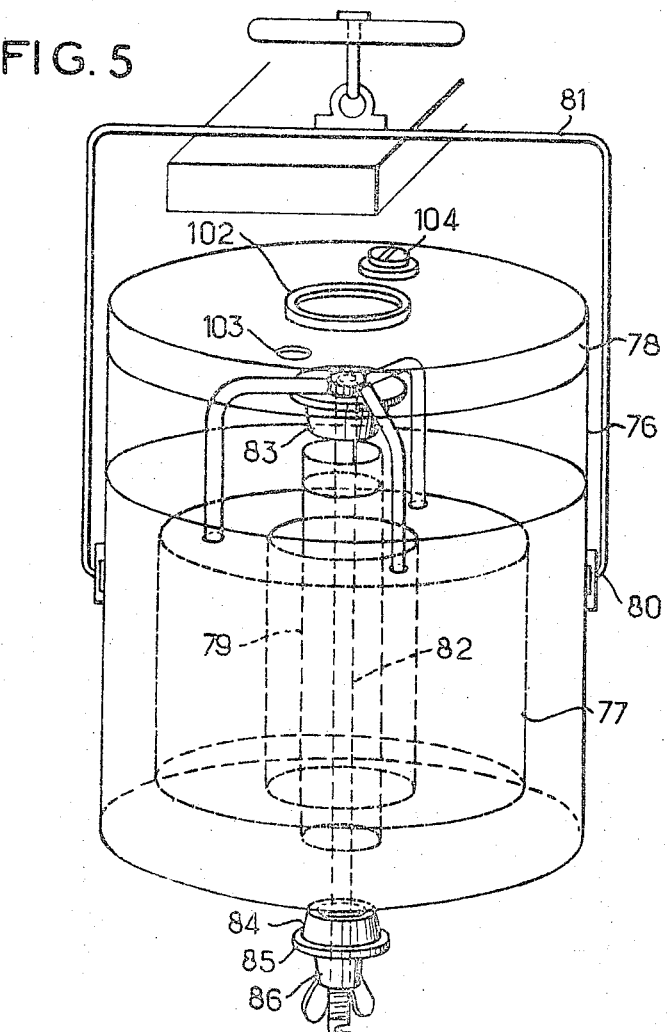
FIG. 5
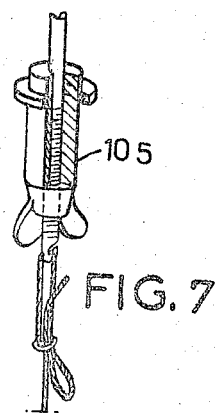
FIG. 7
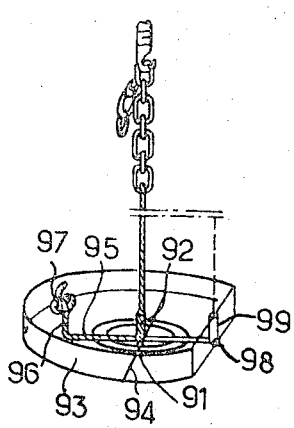
FIG. 6
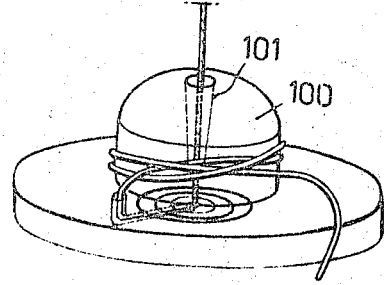
INVENTOR
MARIE PIERRE POITEVIN DE FONTGUYON
By Irwin S. Thompson
ATTY.

INVENTOR
MARIE PIERRE POITEVIN DE
FONTGUYON
By Irwin J. Thompson
ATTY.

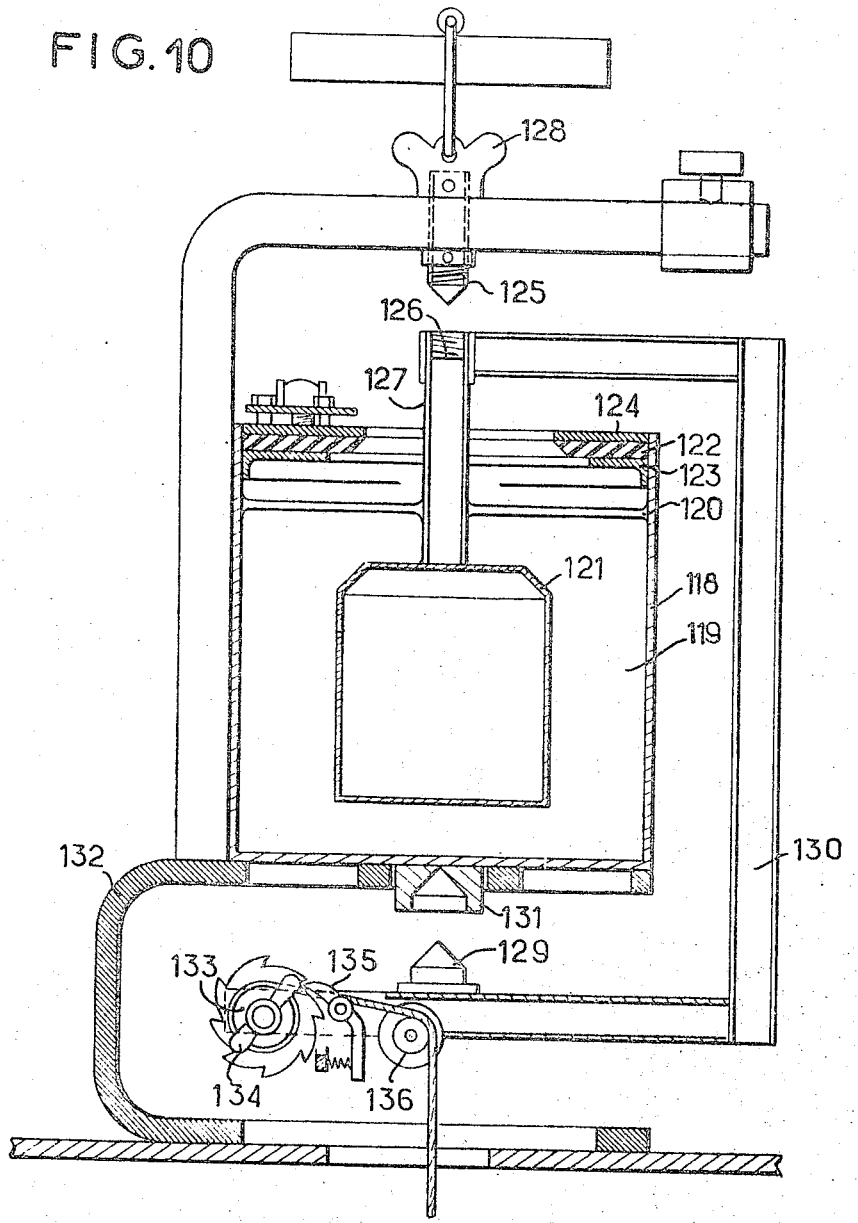

Oct. 24, 1967   M. P. POITEVIN DE FONTGUYON   3,348,315
DEVICE FOR THE STABLE DETERMINATION OF THE VERTICAL
ABOVE A GIVEN POINT
Filed March 3, 1965   5 Sheets-Sheet 5
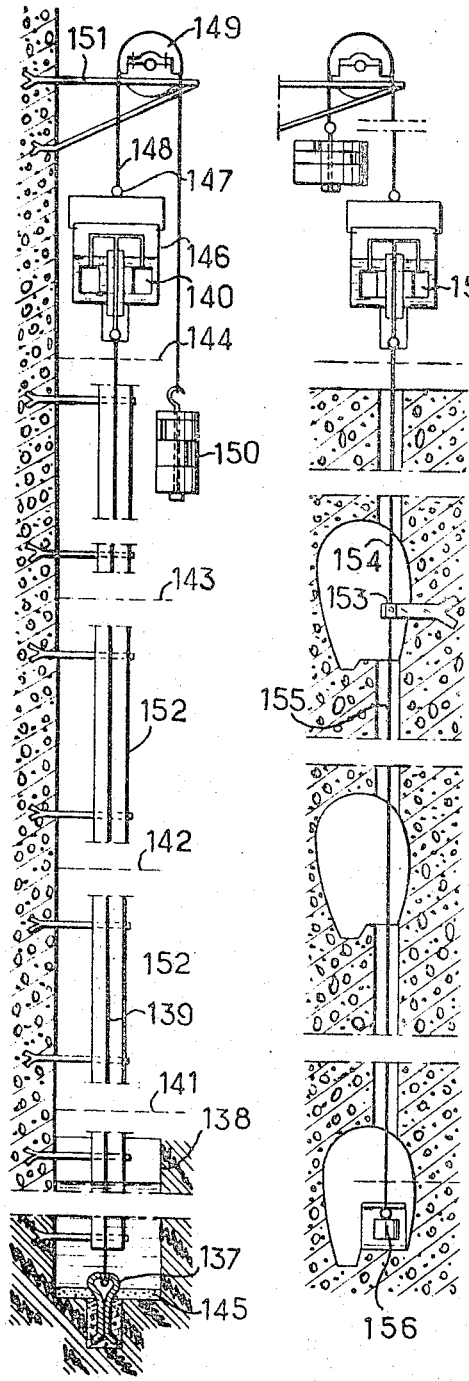
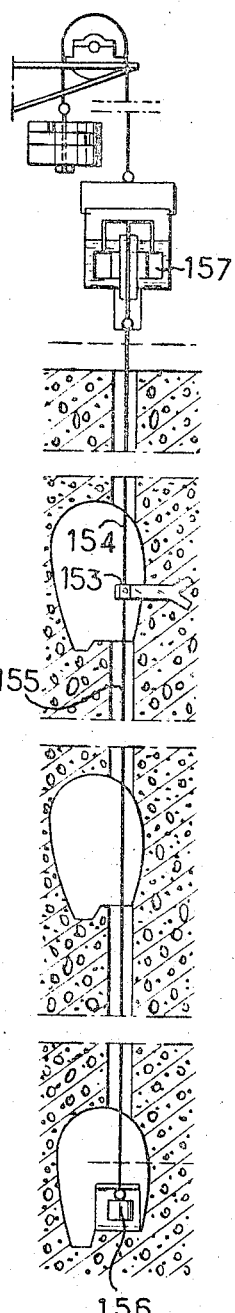
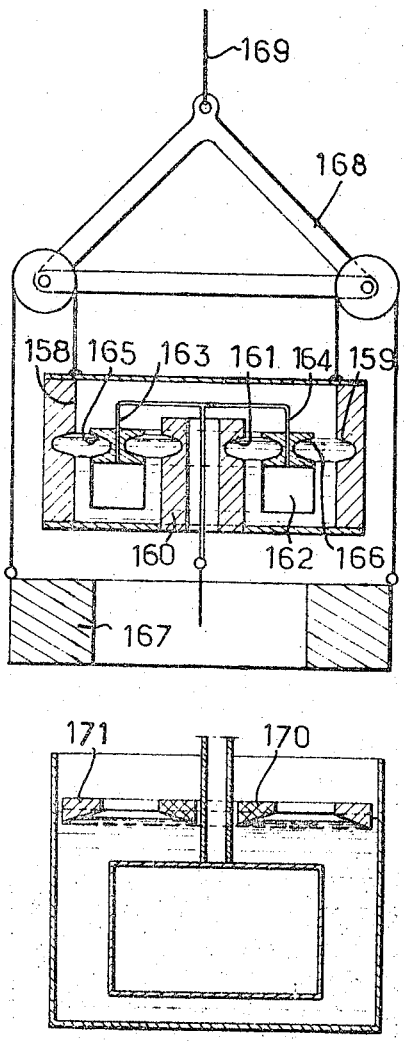
INVENTOR
MARIE PIERRE POITEVIN DE
FONTGUYON
BY Irvin S. Thompson
ATTY.

United States Patent Office 3,348,315
Patented Oct. 24, 1967

3,348,315
DEVICE FOR THE STABLE DETERMINATION OF THE VERTICAL ABOVE A GIVEN POINT
Marie Pierre Poitevin de Fontguyon, 159 Rue de l'Université, Paris 7, France
Filed Mar. 3, 1965, Ser. No. 436,833
Claims priority, application France, Mar. 7, 1964, 966,578
5 Claims. (Cl. 33—206)

In order to determine the vertical at a pre-determined point, the usual means employed is the plumb-line, that is to say a line to which is attached a bob-weight which, in the position of equilibrium, stretches the line along the vertical downwards.

It is only necessary to attach the plumb-line to a given point in order to define automatically the downward vertical of that point down to any lower level. If it is subsequently necessary to determine the vertical at another level lower than the preceding, it is sufficient to extend the plumb-line. This is the case when sinking a well. The plumb-line can be lifted or moved aside in order to work at the bottom, and then the line can be extended so as to continue the checking lower down.

However, when it is desired to determine the vertical upwards above a given point, the plumb-line is less convenient. In order to obtain this upward vertical, the operator must bring, by an accurate adjustment, the upper point of attachment of the line exactly above the given point. If it is required to determine the vertical at a higher level, the operator must not only extend the line but must find a fresh point of attachment exactly above that preceding. This case frequently occurs in the construction of buildings. If the height is considerable, such an adjustment requires the conjoint action of two operators. One at the upper end of the line adjusts the position of the upper point of attachment in accordance with the observations transmitted by the other, at the bottom, who checks the vertical with respect to the given point.

In certain cases, the upper point of attachment cannot be absolutely fixed, for example in the case of a high metallic structure, and in order to correct for displacement, further action of the two operators is necessary.

In other cases, the given point is difficult of acess or becomes so ultimately.

The present invention has for its object a device permitting the stable determination of the vertical above a given point directly by a simple approximate positioning carried out at a single higher level.

This device is constituted by a flexible wire or cable fixed to the given point at its lower extremity and attached to its upper extremity to a float ensuring the tension of the line vertically by reaction against the vertical thrust applied by the liquid in which it is immersed, without the flexible wire or cable passing through the carrier liquid. This may be termed a "floatline" in contradistinction to the plumb-line.

The thrust of the liquid on the float, known as the Archimedean thrust, and having as its value the weight of liquid displaced, has an absolutely vertical direction, directed upwards. It stretches the line associated with the float along the upward vertical, exactly opposite to gravity, the float producing an effect opposite to that of the bob-weight. The center of buoyancy of the float is located spontaneously vertically above the given point, provided that the float does not meet with any obstacle. The vertical position of equilibrium of the float-line is stable, like that of the plumb-line.

For certain work, it is an absolutely exact vertical which is required. It is therefore essential to prevent any parasitic non-vertical force from acting on the float or on the line, as it would be necessary to prevent it from acting on a plumb-line.

Certain of these parasitic forces are readily perceptible, wind for example, but some may exist which are less evident: magnetic fields, electric fields, electrostatic fields, capillary forces, surface tension, etc.

The action of the wind can be avoided by enclosing the line in a tube, the float being protected in the receptacle; the action of the various fields can be prevented by employing insensitive materials, or by taking precautions such as electrical insulation, earthing, Faraday cages, etc.

With the usual kind of lead line, capillary attraction only occurs if the lead is immersed in a liquid in order to damp-out oscillations. On the contrary, in the arrangement which floats which are necessarily immersed in a liquid or a number of liquids, the effects of capillary attraction always exist and are appreciable. Now, the surface of equilibrium of the liquid is horizontal at the center, but it is curved in proximity to the walls, often concave, sometimes convex. Because of this curvature and of the surface tension, a small object floating in the vicinity of the wall will tend to move away from or towards the wall. This movement is caused by a force having a horizontal component. It is necessary to prevent the action of this force on the float.

It is possible to prevent the curvature of the meniscus by inclining the walls of the vessel at the level of the surface of the bath at a well-defined slope, as was indicated by French Patent No. 470,767 in the case of a mercury bath. This results in a frusto-conical portion for the vessel. In order to give a greater possibility of vertical displacement of the float, it may be more convenient to utilize a cylindrical vertical vessel and to have floating on the bath a toric ring cut at the interior following a favorable angle. This ring concentric with the vessel ensures at the interior of the floating torus a horizontal plane, irrespective of the level of the bath and even if the vessel is slightly inclined.

Another toric ring cut at the exterior along a favorable angle may float freely around the emergent portion of the float, thus eliminating the curvature of the bath.

A simpler solution consists of eliminating the effects of capillary attraction and surface tension by totally immersing the float in the liquid. This is effected either by shortening the line or by raising the vessel, or by increasing the height of the liquid in the vessel.

As the line is in free air or in any other gaseous or liquid medium, the members serving to transmit the thrust of the float to the line necessarily pass through the surface of the supporting liquid, but these are rods of small section and these rods pass through the surface of the bath at about equal distances from the walls, so that the resultant of the effects of capillary attraction and surface tension has a horizontal component which is practically zero.

Although it is entirely immersed in the liquid with the possibility of movements both horizontally and vertically which enable it to asume its position of equilibrium, the float cannot strike the walls since the dimensions of the various members of the device are such that it has members which can be seen by the operator which limit or make it possible to limit the movements of the float.

The float may have the shape of a horizontal ring floating like a lifebuoy. The member which transmits the thrust corresponding to the immersion of the ring is constituted by a kind of reversed grapnel, the arms of which are in contact with the floating ring while the central rod stretches the line while passing inside the ring at its axis, directly above the center of buoyancy of the ring-grapnel assembly. In order to permit the passage of the bottom of the grapnel rod through the bottom of the vessel, there is provided an orifice in the center of this bottom, and in order to contain the liquid in spite of this orifice, a vertical tube open at its two extremities is fixed hermetically to the bottom around this orifice and rises inside the liquid along the axis of the vessel.

The float may have the form of a vertical cylinder. The member transmitting the thrust corresponding to the immersion of the cylinder comprises a vertical rod passing out of the top of the vessel and being supported on the float at its axis and fixed rigidly to a frame or to an arm passing widely around the vessel and enabling the line to be attached to the bottom of this frame or of this arm, below the vessel, vertically above the center of buoyancy of the float-rod-frame assembly or enclosing arm.

The float may be sub-divided into two or more floats distributed about the vertical to be determined, in separate vessels. A rigid T or a reversed grapnel applies simultaneous contact to these two or more floats.

The device according to the invention can be used with advantage in all cases where, in order to determine a rising vertical, a plumb-line is used, especially in building work or for its inspection, for example for the study of deformations of works such as dams, bridges, structures, various mechanisms. As compared with the plumb-line it has the advantage of supplying the rising vertical above the point of attachment of the line spontaneously after a simple approximate position, and this is effected in a stable manner.

These advantages are particularly valuable when the lower point of attachment may become inaccessible, for example when it is necessary to determine the vertical above points of reference located at the bottom of a well or at places to which access will no longer be possible for any particular reason when the construction has been completed: passage too narrow, flooded with water, excessive heat, biological, chemical or other contamination by radiation, etc.

In these cases, the device according to the invention continues to provide the vertical above the given point, whereas the usual plumb-line can no longer provide this in practice by reason of the difficulties in controlling the lower level.

The accompanying drawings illustrate by way of example only and without implied limitation, forms of embodiment of the device according to the invention.

In the drawings:

FIG. 5 is a view in perspective of a particular form of construction;

FIGS. 6 and 7 illustrate methods of fixing the line at its lower portion;

FIG. 10 shows in cross-section an alternative form comprising a device for adjusting the length of the line;

FIG. 11 shows a method of obtaining a vertical of great height with the device according to the invention;

FIG. 12 shows a further method of use of the device combined with a plumb-line;

FIG. 13 shows a view in cross-section of a particular form of float;

FIG. 14 relates to another form of construction.

Figure 1:
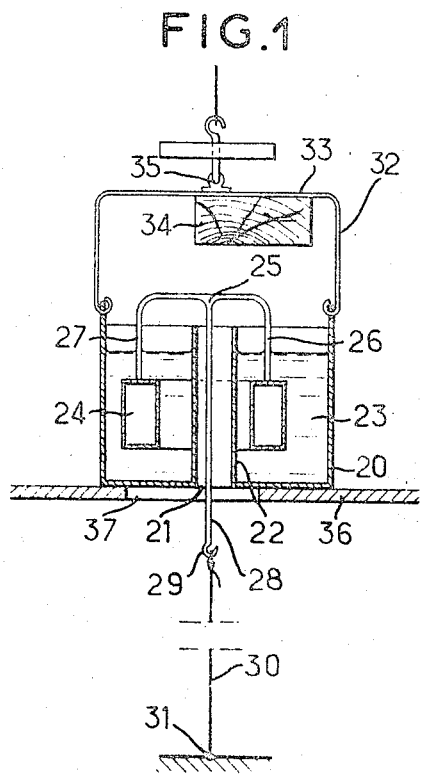
FIG. 1 is a view in cross-section of the device with an annular float.

In accordance with FIG. 1, the device for determining the vertical comprises a cylindrical vertical vessel 20, in which the center of the bottom is pierced with an axial orifice 21. A vertical tube 22 located in the center of the vessel 20 is hermetically sealed to the orifice 21. This vessel 20 contains a liquid bath 23 of annular form around the central tube 22. A float 24, also in the form of a ring but having a substantially smaller volume, is immersed in the liquid bath 23. A reversed grapnel 25 is permanently or removably fixed on the top of the float 24 by the extremities of its two or more arms 26–27. The central rod 28 of this grapnel 25 passes freely through the central tube 22. At its lower part, this rod 28 is provided with a hook 29 to which is attached the wire 30 which is further attached at its lower part to the given point 31.

The vessel 20 can be carried by hand by its handle 32 comprising a central horizontal portion 33 which enables this handle to be placed over a supporting member 34, fairly narrow and having a substantially horizontal upper surface. This handle 32 provides the possibility of movement in all directions without unbalancing the vessel 20.

The handle 32 is provided at its center with a hooking eye 35 permitting of a balanced suspension under any kind of support, and in particular under a support movable in all directions such as those employed for office lamps or telephone receivers of the pantograph mounting type.

The vessel 20 may be quite simply placed on a substantially horizontal support 36 provided with an adequate orifice 37. The vessel 20 may be placed on a tripod provided with a plate having a suitable central orifice, such as the tripods of modern theodolites. The vessel 20 can even be provided, if this is necessary, with wedging screws and means for fixing to the tripod.

If the vessel 20 has been placed, by any of the means specified above, in the vicinity of the vertical of the given point 31, and if the length of the line 30 has been approximately adjusted so that the float 24 is immersed without touching the vessel 20 and without the grapnel 25 touching the central tube 22, the float 24 will place itself spontaneously so that the center of buoyancy of the float-grapnel assembly comes exactly above the given point 31.

By virtue of the damping of the oscillations by the liquid bath 23, the position of equilibrium is rapidly attained, and the line 30 defines exactly the rising vertical of the given point 31.

In certain cases, the liquid bath 23 is constituted by several superimposed non-miscible liquids, for example water surmounted by oil.

In other cases in which a large thrust force is required from the float while maintaining a small overall size, the lower liquid may be of mercury or an amalgam, and the upper liquid may be a thin layer of glycerine, silicone, oil, etc.

If the position of the vessel 20 is or becomes too far from the vertical of the given point 31, the rod 28 of the grapnel 25 comes into abutment against the central tube 22 before the float touches the wall, which the operator would not be able to see. The operator should displace the vessel until there is no contact between the rod 28 and the tube 22.

If the line 30 is too short or becomes so, the grapnel 25 comes in contact with the top of the central tube 22 before the float touches the bottom of the vessel, which the operator may not see. The operator should extend the line or lower the vessel.

If the wire 30 is too long or becomes so, the float becomes partly emergent and the thrust is correspondingly reduced, but it remains vertical unless the float has a very off-center position, in which the effects of capillary attraction or surface tension are thus to be feared. The operator should stretch the line or center the vessel on the float.

Figure 2:
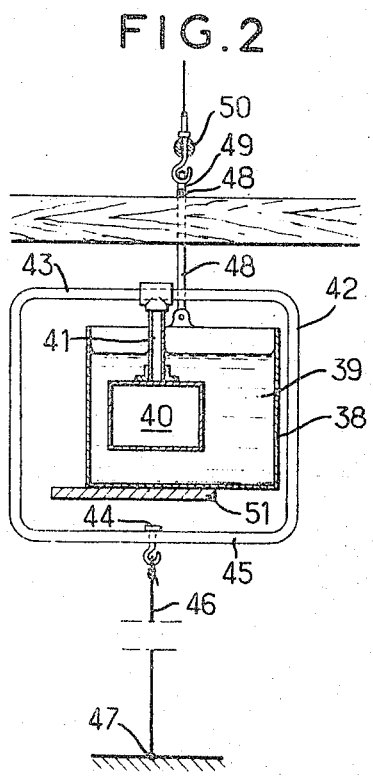
FIG. 2 shows a cross-section of the device with a cylindrical float.

Referring now to FIG. 2, the device for determining the vertical comprises a vertical cylindrical vessel 38 containing a liquid bath 39. A vertical cylindrical float 40 of substantially smaller volume is immersed in the liquid bath 39. A vertical rod 41 is rigidly fixed in a removable or permanent manner to the float 40. Its axis passes through the center of the float 40. The top of the rod 41 is assembled rigidly, welded or removable, to the center of the horizontal side 43 of a vertical, substantially rectangular frame 42 which widely encloses the vessel on each side, above and beneath. A swivel-hook 44 is mounted in a vertical hole in the center of the lower horizontal side 45 of the frame 42, in the extension of the vertical axis of the float 40. The top of the line 46 is attached under the swivel hook 44, while the bottom of the line 46 is attached to the given point 47. A handle 48 similar to the handle 32 of FIG. 1 provides a support for the vessel 38, passing above the horizontal side 43 of the vertical frame 42. This handle can rest on a relatively thin support with a horizontal upper surface, or it may be suspended by its center at which it is provided with an eye 49, to which may be hooked a handle 50 with a swivel, or any other means suitable for displacement.

In other cases, the vessel 38 may be supported by a relatively thin bracket 51 passing between the bottom of the vessel and the lower side of the frame.

The vessel 38 may in other cases be supported by a vertical member fixed along a generator line of the cylinder of the vessel located in a vertical plane different from that of the frame.

If the vessel 38 has been placed in the vicinity of the vertical of the given point 47 and if the length of the line has been approximately adjusted so that the float 40 is immersed without the float 40 either touching the vessel 38 or the frame 43 touching the vessel 38 or its supporting means, handle 48, bracket 51 or upright (not shown), the float 40 places itself spontaneously so that the center of buoyancy of the float-frame assembly comes exactly above the given point 47.

Figure 3:
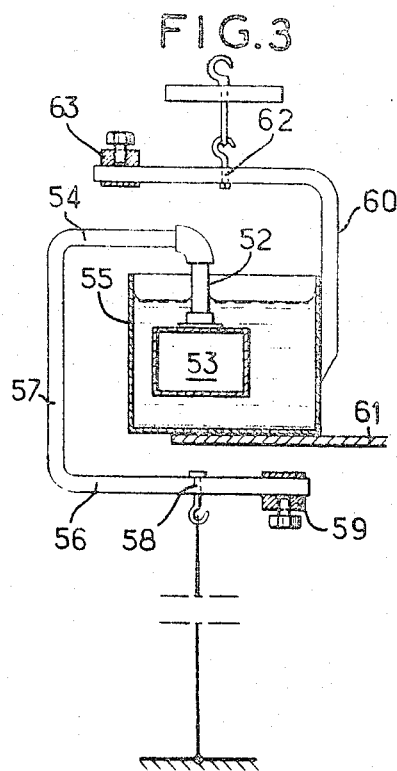
FIG. 3 is another form of construction of the device with a cylindrical float.

FIG. 3 shows an alternative form of the arrangement of FIG. 2. The vertical rod 52 which is rigidly assembled, welded or removable, to the upper part of the float 53 is extended, by welding or removably, by an arm 54 which has two elbows and passes widely round the vessel 55 like the half of the rectangular frame of FIG. 2. The lower horizontal portion 56 of this half-frame 57 is provided with a swivel hook 58 located in the extension of the vertical axis of the rod 52 and the float 53. An adjustable counter-weight 59 enables the half-frame 57 to be balanced.

A vertical member 60 fixed to the wall of the vessel 55 is continued at the top by a horizontal arm provided with a swivel hook 62 mounted in the upper extension of the vertical axis of the vessel. An adjustable counter-weight 63 enables the spontaneous verticality of the vessel 55 to be ensured when it is suspended by the swivel hook 62.

The advantage of this arrangement is that the half-frame 57 can rotate almost one complete revolution about the vertical axis of the float 53 without abutting against the vertical member 60, while the frame 42 of the previous arrangement will abut before having made half a revolution.

With the half-frame 57, the operator has much less need to act on one or the other of the swivel hooks 58 or 62 in order to prevent abutment of the half-frame 57 against the upright 60 than he would have with 44 or 50 when using the frame device. Now, it frequently happens that a wire or cable causes rotation of the frame when it is put under tension, since flexible wires or cables which are truly anti-gyratory are rare.

The device with a half-frame 57 also permits advantageously the support of the vessel 55 by a relatively thin bracket 61.

Figure 4:
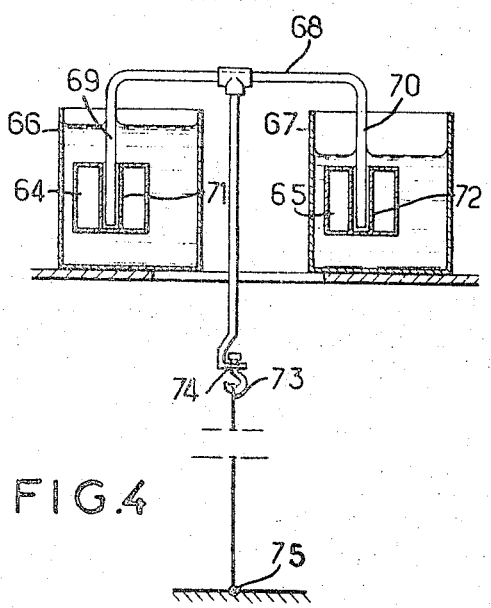
FIG. 4 shows in cross-section an alternative form of the device with two floats.

FIG. 4 shows an alternative form in which the device is constituted by two vertical cylindrical floats 64 and 65, each immersed in a separate cylindrical vessel 66 and 67. The grapnel 68 which is in contact with the two floats by its arms 69 and 70 is fixed to the floats 64 and 65 in a readily removable manner.

The floats 64 and 65 each comprise along their axis a tube 71 and 72 closed at its lower extremity. The arms 69 and 70 of the grapnel 68 slide in these tubes 71 and 72 and are thus supported on the two floats 64 and 65.

The line 73 attached to the swivel hook 74 at the bottom of the grapnel 68 gives the exact vertical of the given point.

FIG. 5 represents an alternative form of the device shown in FIG. 1, improved in order to be more readily transportable without risk of spilling the liquid and to control more easily the freedom of movement of the float and the grapnel.

The vessel 76 is of transparent material, for example the materials known by the commercial names of Plexiglas, Altuglass, etc. together with the float 77. The liquid is for example glycerine diluted with water. A transparent cover 78, removable or not, closes the vessel 76. The internal axial tube 79 is also transparent.

The respective diameters of the cylinders of the vessel 76, the float 77 and the rod 82 of the grapnel are such that the float can never touch either the axial tube 79 or the vessel 76. The rod 82 comes previously into abutment against the interior of the tube 79. The bottom of the float cannot touch the bottom of the vessel. The plug 83 fixed on the top of the rod 82 comes in fact into position to close the tube 79 before this contact can take place.

If the free space between the top of the axial tube 79 and the cover 78 is sufficient so that when the vessel is turned upside down with the cover at the bottom, the level of the liquid does not reach the orifice which is now at the lower part of the axial tube, and if the vessel is placed on its side, the level of the liquid does not reach the axial tube which has become horizontal. It is only possible to spill out the liquid by shaking the vessel. The vessel can therefore be carried with its cover 78 on top or at the bottom. The pivots 80 of the handle 81 are at half the height of the vessel. This permits the vessel to be placed with its top underneath without being interfered with by the rod 82 on the outside of the vessel.

Nevertheless, the hermetic closure of the top of the tube 79 can be ensured by a plug 83 threaded over and fixed at the top of the rod of the grapnel, and the closure of the tube 79 can be effected by a plug 84 threaded freely at the bottom of the rod. The actuation of the plugs 83 and 84 is effected simultaneously by the upward movement of the washer 85, pushed by the wing-nut 86.

The closures of the top and the bottom of the tube 79 can be effected by joints fixed at the top and the bottom of this tube, instead of the plugs 83 and 84.

The length of the line 87 is adjusted by means of the tightener 88, or by any other means. The line 87 is passed into the vertical hole 89 which represents the given point. The line can be locked by a simple knot 90 or otherwise attached.

In other cases, the given point is only marked, for example by a punch mark on a metal part. It may be advantageous to fix the line (see FIG. 6) to the given point 91 by causing the wire to pass through an auxiliary vertical hole 92 pierced in a transparent piece 93, a disc of Plexiglas for example. The lower face of this piece 93 is provided with concentric circles engraved around the hole 92 and also with an engraved cross 94.

An arm of this cross is formed by a groove 95 capable of serving as a housing for the line between the lower face of the piece 93 and the part carrying the given point 91. A vertical hole 96 permits the passage of the line from the groove to the upper face of the part 93, in which it is possible to make a knot 97.

Sometimes the given point 98 is against a vertical object. In this case, the line is not passed into the central hole 92 but into a vertical hole 99 against a vertical section of the piece perpendicular to the groove 95. Sometimes the transparent disc 93 is replaced by a Stanhope boss 100 pierced at its center with a slightly conical hole 101 (see FIG. 7).

This piece 93 or this boss 100 are held centered on a given point by means of heavy objects, magnets or by any other means.

A ring 102 located under the cover 78 of the vessel forms the center and prevents any possible friction of the top of the grapnel against the lower face of the cover 78 when the nut 86 is unscrewed.

Two orifices 103 are pierced in the cover on a diameter perpendicular to the handle, and threaded so as to receive closure screws 104.

In some cases, in order to avoid having to screw the wing-nut 86 over the entire vertical travel of the float, a spacing piece 105 is employed, which can be placed rapidly between the nut 86 and the washer 85 or between the nut 86 and the lower orifice of the axial tube 79 when it is desired to close the tube 79 with the plug 83, with or without the plug 84.

This piece 105 is constituted by a tube provided with a vertical cut arranged so as to permit its application against the rod 82.

The piece 105 can be held in position against the rod 82 by means of two circular housings, one under the washer 85, the other on the nut 86, this latter housing or the other comprising a cut which only permits the passage of one extremity of the piece 105 when this cut is positioned for that purpose.

Figure 8:
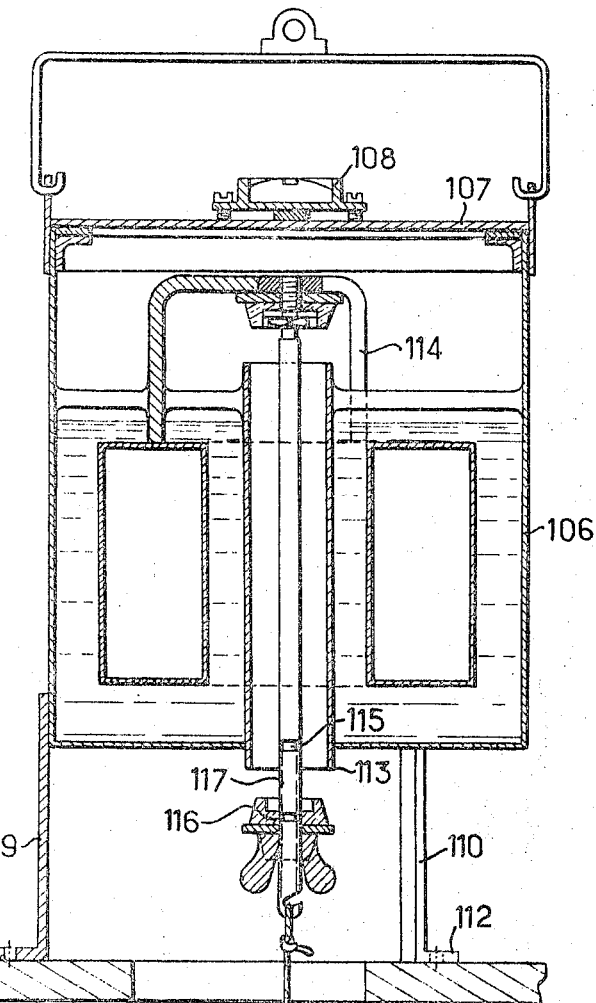
FIG. 8 is a view in vertical detailed section of another embodiment of the invention.

FIG. 8 represents a further alternative form.

The vessel 106 is neither transparent nor reversible. It is provided with a removable cover 107 which may be transparent. This cover may be provided with a spherical level 108 permitting the control of the verticality of the vessel 106. The vessel may be carried by its handle or placed on three feet 109–110, the toes of which 111–112 are pierced with threaded holes and can be provided with locking screws. The axial tube 113 projects underneath the vessel, and here can be located the control of the freedom of movement of the float-grapnel assembly. In fact the float and the grapnel 114 are dimensioned so that the float cannot in any case come into abutment. Only the top of the grapnel 114 can abut against the cover 107 or against the top of the axial tube. Two circular reference marks 115 and 116 on the bottom of the rod 117 of the grapnel enable the operator to be informed as to the danger of abutment. He knows that the bottom of the tube 113 must appear between the reference marks 115 and 116, and that the rod 117 must not touch laterally the bottom of the tube 113. The space on the rod 117 comprised between the reference marks 115 and 116 can be painted a bright color. The bottom of the tube 113 can receive a transparent extension tube enabling the line to be protected against wind.

Figure 9:
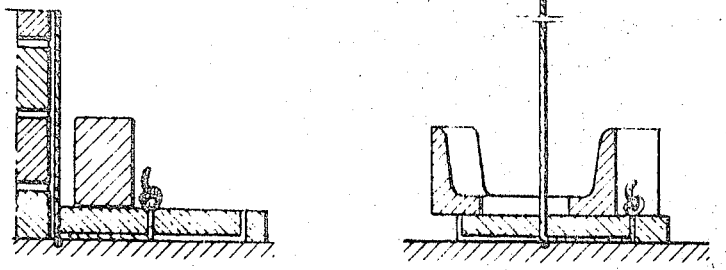
FIG. 9 shows a further method of fixing the line at its lower portion.

The line attached to the float can be fixed as indicated in FIG. 8 or held in position by a heavy weight. Another form of fixing is shown in FIG. 9, adapted to the determination of the verticality of a wall.

FIG. 10 shows an alternative form of the device of FIG. 3, improved so as to permit easier transport without emptying the bath, a simpler adjustment of the length of the line and an easier positioning of the vessel. The vessel 118 contains a liquid bath constituted for example by mercury 119 surmounted by a film of glycerine 120. The float comprises a frusto-conical upper portion 121 intended to close the upper orifice of the vessel by compressing the joint 122 clamped between a ring 123 and the removable cover 124 held in position by screws.

In order to assist this compression during transport without precaution, the screw 125 can engage in a threaded hole 126 at the top of the rod 127 of the float. This screw 125 can be rotated by means of the wings 128. At the same time, a centering point 129 ensures the correct position of the enclosing arm 130 by passing into a housing 131 centered under the vessel.

A movable part 132 having a U-section on its side can be placed or fixed under the vessel. It is provided with suitable orifices to lighten it and to provide for the passage of the line.

A coil 133 provided with operating lugs 134 and associated with a ratchet system 135 enables the unwound length of the line to be adjusted, this passing over a small pulley 136 which ensures its centering.

FIG. 11 shows a rising vertical established over a great height, for example for measuring the deformation of a dam. The reference point 137 is sealed into the bottom of a well 138 cut into the rock lower than the foundation. This well is filled with water at the time of measurement. The reference 137, constituted for example by a flat strip of stainless steel bent back to form a sealing lug is pierced with a small vertical hole, to which is attached a fine flexible cable of stainless metal 139, tensioned by the float 140. This fine cable is observed at various levels 141–142–143–144 with respect to appropriate reference marks in order to determine the horizontal components of the displacement of these reference marks with respect to the deep reference point 137. The top of this lug 137 is slightly raised with respect to the bottom of the well, above the level of possible sediment 145. The vessel 146 is suspended freely vertically by its eye 147 from a cable 148 passing over a pulley 149 and having a set of adjustable counterweights 150. The pulley 149 is carried by journal bearings, the position of which on the bracket 151 can be adjusted. The advantage of this suspension with adjustable counterweights is that, if the length of the cable 139 varies due to thermal expansion for example, the cable 148 automatically takes-up this variation, on condition that the bearings of the pulley 149 are in good condition. The protection of the cable 139 is ensured by vertical tubes 152 held in position by sealed-in collars.

FIG. 12 shows the simultaneous determination of the rising vertical of the reference point 153, sealed into a tunnel at the mid-height of a dam, by a float cable 154, and the downward vertical by means of a plumb-line 155. The cable 154, 155 can be slightly clamped at 153 to avoid the need of exactly balancing the lower weight 156 against the thrust of the float 157.

FIG. 13 shows an alternative form of the device specially designed for the use of a minimum volume of mercury as the carrier liquid in a vessel suspended from one or more cables tensioned by one or more well-adjusted counter-weights.

The vessel 158, spontaneously vertical by suspension, has a cylindrical profile at the bottom, then a toric profile higher up and then frusto-conical at 159 at the level of the surface of the mercury, with an inclination chosen so as to produce a horizontal surface of the bath.

The central cylindrical tube 160, cylindrical at the bottom, comprises a toric groove which becomes frusto-conical at 161 at the level of the mercury and inclined substantially opposite to 159. The annular float 162 is surmounted by the vertical arms 163 and 164 of a reversed grapnel. The arms 163 and 164 fixed to the float 162 are each surrounded by a washer 165–166 in the form of a pulley, also fixed to the float. These washers have a toric groove which is then frusto-conical at the level of the surface of the mercury, like 161. Instead of fixing these two small washers 165 and 166 to the float, there may be employed a float constituted by a body of revolution comprising a groove which has a profile corresponding substantially to that shown in the figure.

This device olny requires a small vertical travel of the float in the vessel, since the Archimedean thrust diminishes substantially, for example when the washers 165 and 166 pass above the liquid, and the counter-weight 167 of the suspension acts immediately and spontaneously so as to raise the vessel 158. The counter-weight 167 shown is in the form of a ring. It could be above or even around the vessel.

The frame 168 may be suspended from the cable 169 attached for example to the hook of a travelling crane brought into the approximate vicinity of the rising vertical to be established.

FIG. 14 shows a device which also works with mercury, in which the float is fixed to a skirting arm (not shown) of the kind seen in FIGS. 2 and 3. The vessel is not balanced as in FIG. 13. It is placed on a fixed support (not shown) as in FIGS. 1 to 4. In order to permit the necessary vertical travel of the float in the vessel, while at the same time ensuring a bath with a horizontal surface without convex meniscus, the device comprises two concentric frusto-conical rings, one, 170, around the vertical cylindrical rod surmounting the float, the other, 171, against the walls of the cylindrical vessel. These two rings float freely. The well-defined inclinations of the cones are substantially symmetrical, like those of the suspended device.

What I claim is:

1. A portable device for the stable determination of the vertical above a given point located outside said device, comprising: a line, means for attaching said line to said given point, a vessel having a vertical axis and containing liquid, a vertical axial tube having one of its extremities opening through the bottom of said vessel and the other extremity opening above the surface of the liquid, an annular float immersed in the liquid of said vessel, a grapnel that has arms and that is fixed to said float by said arms and that has an axial rod that is secured to said line and that passes through the axial tube, a fluid-tight cover on the top of said vessel, a plug adapted to close the top of said axial tube by the clamping action of a nut causing said rod of said grapnel to move axially, said nut being threaded on said rod and being adapted to press against the underside of the axial tube, a second plug threaded over the bottom of the grapnel rod between said nut and said tube and adapted thereby to immobilize the float in said vessel during the transport of said device, and means for supporting said vessel above said given point.

2. A portable device for the stable determination of the vertical above a given point located outside said device, comprising: a line, means for attaching said line to said given point, a vessel with a vertical axis and containing a liquid, a float immersed in the liquid of said vessel, means for coupling said float to said line, means for closing said vessel and for immobilizing said float in the vessel during the transport of the device, a pulley, a suspension cable carried by said pulley, and a counterweight tensioning the cable and balancing the weights of the vessel, the liquid, the float, the means coupling said float to said line, and the line, whereby the tension of the line is thus made constant and is substantially equal to the thrust of the liquid on the float.

3. A portable device for the stable determination of the vertical above a given point located outside said device, comprising a line, means for ataching said line to said given point, a vessel having a vertical axis and adapted to contain a liquid, the bottom of said vessel having an axial orifice and being provided with a vertical axial cylindrical conduit open at its two extremities and extending upwardly from said orifice, an annular float adapted to be immersed in the liquid in the vessel and surrounding said conduit, a grapnel fixed to said float and having arms and an axial rod for carrying the line attachment means, said rod passing through the axial cylindrical conduit, a fluid-tight cover on the top of said vessel, a plug carried by the rod and adapted to close the top of the axial cylindrical conduit, and a nut adapted to press against the under side of the device and to draw the axial rod downwardly to pull the plug against the top of the conduit to prevent liquid from entering the conduit during transport of the device.

4. A device as claimed in claim 3, and a second plug disposed between said nut and said device and surrounding said rod and being adapted to be forced into the lower end of said axial cylindrical conduit upon tightening of said nut upon said rod.

5. A device as claimed in claim 3, and a pulley, a suspension cable carried by said pulley by which said vessel is suspended, and a counterweight tensioning the cable and balancing the weights of the vessel, the liquid, the float, the means coupling the float to the line, and the line, whereby the tension of the line is thus made constant and is substantially equal to the thrust of the liquid on the float.

References Cited

UNITED STATES PATENTS

| 1,836,079 | 12/1931 | McBride | 33—206 |
| 2,602,231 | 7/1952 | Madison | 33—73 |
| 2,939,221 | 6/1960 | Pickett | 33—206 |
| 2,714,766 | 8/1955 | Saxon et al. | 33—217 |
| 3,276,123 | 10/1966 | Huggenberger | 33—1 |

FOREIGN PATENTS 7,203  3/1903  Great Britain.

LEONARD FORMAN, *Primary Examiner.*

L. ANDERSON, *Assistant Examiner.*